No. 622,560. Patented Apr. 4, 1899.
A. W. STOTT.
FRUIT SEEDING MACHINE.
(Application filed Aug. 27, 1897.)
(No Model.) 2 Sheets—Sheet 1.
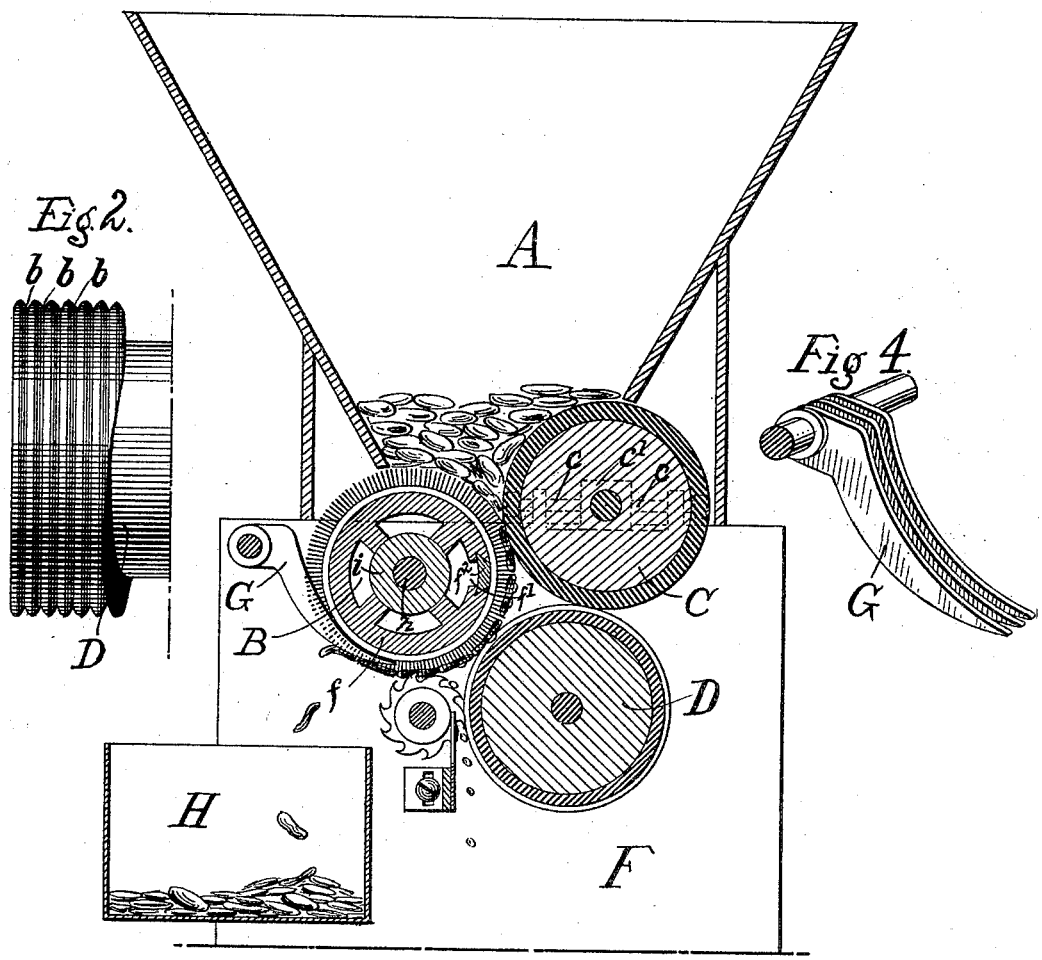
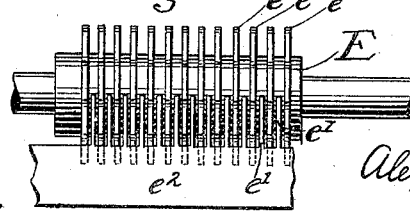

No. 622,560. Patented Apr. 4, 1899.
A. W. STOTT.
FRUIT SEEDING MACHINE.
(Application filed Aug. 27, 1897.)
(No Model.) 2 Sheets—Sheet 2.
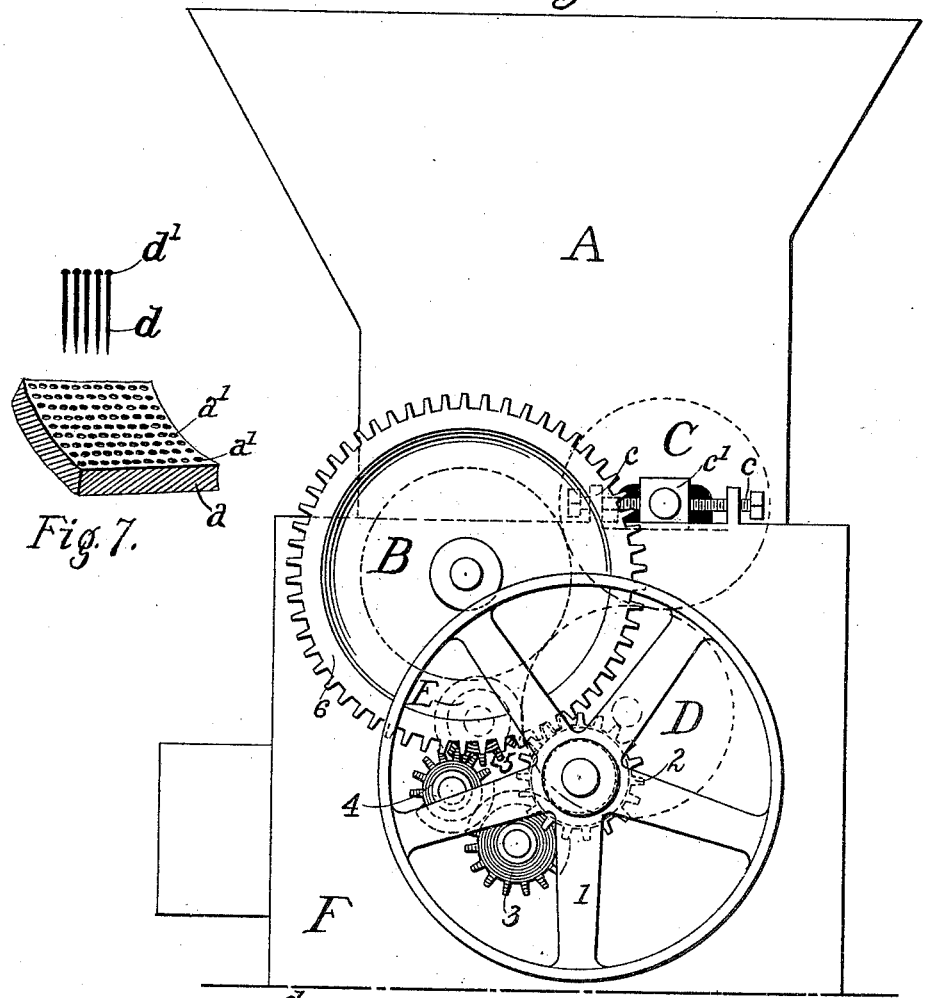
Fig. 5.
Fig. 7.
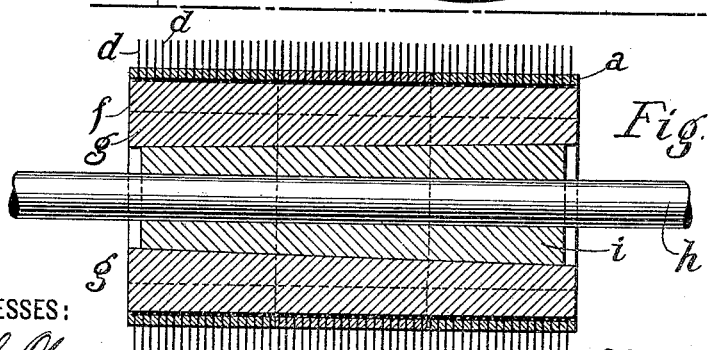
Fig. 6.
WITNESSES:
INVENTOR
Alexander W. Stott
BY
Edwards, Ryan & Lawyer
ATTORNEYS.

UNITED STATES PATENT OFFICE.

ALEXANDER W. STOTT, OF NEW YORK, N. Y., ASSIGNOR TO THE HILLS BROTHERS COMPANY, OF NEW YORK.

FRUIT-SEEDING MACHINE.

SPECIFICATION forming part of Letters Patent No. 622,560, dated April 4, 1899.

Application filed August 27, 1897. Serial No. 649,693. (No model.)

*To all whom it may concern:*

Be it known that I, ALEXANDER W. STOTT, a citizen of the United States, residing at New York, (Brooklyn,) in the county of Kings and State of New York, have invented certain new and useful Improvements in Fruit-Seeding Machines, of which the following is a full, clear, and exact specification.

My invention relates in general to fruit-seeding machines of the type wherein is employed a cylinder having a surface of points or needles arranged to engage and exclude the seeds of fruit impaled on the needles of the cylinder, and the invention has particular reference to said cylinder, the object of the invention being to construct a cylinder for this purpose which shall be simple in construction and durable and efficient in operation.

The nature and scope of my said invention will more clearly hereinafter appear by reference to the accompanying drawings, in which I have illustrated a common type of seeding-machine having applied thereto my invention, it being here noted that I do not confine the use of my invention to the type of machine here shown, because the invention may be applied to any desired type of machine.

In the drawings, Figure 1 is a sectional view of a seeding-machine embodying my invention as a part of its construction. Fig. 2 is an enlarged detail view of the presser-roller. Fig. 3 is a similar view of the seed-stripper and its comb. Fig. 4 is a similar view of the fruit-stripper. Fig. 5 is an end view of the machine shown in section in Fig. 1. Fig. 6 is an enlarged sectional side view of the cylinder; and Fig. 7 is an enlarged detail of a portion of the shell of the cylinder, showing the manner of placing the needles.

Referring more particularly to the drawings, A represents the hopper of the machine; B, the cylinder; C, the presser-roller; D, the stripper-roller, and E the seed-stripper. These are mounted in the frame F. Power is communicated to the machine through driving-pulley 1, independently mounted in the frame and carrying a pinion 2, which meshes with a small gear-wheel 3. Gear-wheel 3 in turn meshes with a gear-wheel 4, and gear-wheel 4 meshes with a gear-wheel 5 on the shaft of the seed-stripper. The motion of the driving-pulley is therefore imparted to the seed-stripper. Pinion 2 also meshes with a gear-wheel 6, mounted upon the shaft of the cylinder, by which means the latter is rotated by the driving-pulley. Presser-roller C is of soft material and impinges against the surface of the cylinder, which is covered with sharp points, and therefore the rotation of cylinder B causes roller C to revolve. Roller D is of harder material, and its surface is indented by annular depressions $b\ b$, as shown in the enlarged view, Fig. 2. These depressions correspond with the rows of needles on the cylinder, each circumferential row of needles on the cylinder fitting into an annular depression $b$ in roller D. Roller D also impinges against the surface of roller C and is therefore revolved by the rotation of the latter. $c\ c$ are set-screws on either side of the journal $c'$ of the presser-roller shaft, whereby said roller may be adjusted and moved toward and away from the cylinder. Seed-stripper E is composed of a shaft having mounted thereon a plurality of disks $e$, having sharpened teeth, the disks being disposed between the lines of needles on the cylinder and opposite the depressions in the roller D. The stripper-comb $e^2$ is disposed between the roller D and the seed-stripper and has teeth $e'\ e'$ projecting up between the respective rows of needles on the cylinder.

In the operation of the machine the fruit in the hopper is drawn between the cylinder and presser-roller and by the latter impaled upon the needles of the former, the needles catching the seeds upon the points of the needles and the soft fruit being pressed farther down. As the cylinder revolves further some of the seeds are knocked off by roller D and the rest are brushed or picked off by the stripper E. A still further revolution of the cylinder causes the raisins to strike against the points of the strippers G G and be pushed off the cylinder, dropping into the hopper H.

The machine thus far described is a seeding-machine of common construction in use at the present time, with the exception of the cylinder, which will be more particularly hereinafter described, and I therefore do not claim such construction as new. Heretofore in machines of this general nature the cylinders employed have usually consisted of a number of disks or plates mounted parallel to each other upon a central common shaft. The periphery of each disk has formed therein a groove adapted to receive the ends of the needles, which are set therein and fixed by pouring molten metal in the groove and allowing the metal to harden. This heats the needles and therefore weakens them. The space between the disks is also objectionable, because of its affording a place for the soft and sticky fruit to collect in and clog the machine. When the needles are set in this manner and become broken, they cannot be replaced or removed without removing the entire disk and remelting the soft metal. I propose to obviate these difficulties by utilizing a cylinder which shall present a solid surface studded with the needles and from which one or more of the needles can be readily removed or replaced.

In the drawings, $a$ is a solid cylindrical shell having drilled therethrough a plurality of perforations $a'$ $a'$ $a'$, the perforations preferably being arranged in parallel rows around the circumference of the cylinder. The needles $d$ $d$, having heads $d'$ $d'$, are inserted in the perforations from the inside of the shell, pointing outward, the heads of the needles preventing them from being drawn out of the shell. Instead of forming the heads $d'$, however, the needles may be tapered toward their points and the perforations correspondingly formed, so that the needles cannot be drawn entirely through the shell, or, in fact, any other suitable means for accomplishing the same result may be employed. A backing-cylinder $f$ is inserted inside of shell $a$, and its circumference forms a support for the heads of the needles and prevents them from being forced into the center of the cylinder. The backing-cylinder may be split by a slot $f'$ to permit expansion and contraction of the cylinder, and where such slot is used it will be well to insert therein a filling-strip $f^2$ to support the pins adjacent to the slot, as illustrated in Fig. 1. The cylinder $f$ is also provided with a plurality of inwardly-depending legs $g$ $g$, the ends of which present surfaces tapering toward the axis of the cylinder, at one end thereof, and upon shaft $h$, upon which cylinder B is mounted, is a loose sleeve $i$, having its outer surface tapering in the same direction as the taper of the surfaces of legs $g$ $g$. When sleeve $i$ is driven against the tapered legs $g$, the cylinder $f$ will expand against the heads of the needles, and thus hold the needles tightly in place. The sleeve $i'$ should be keyed to shaft $h$ or firmly grip the same or be otherwise arranged, so that the sleeve and cylinder B will necessarily rotate with shaft $h$. By unkeying or loosening sleeve $i$ the cylinder $f$ will contract and may be partly or wholly removed and one or all of the needles quickly knocked out of the shell and new needles inserted. When by reason of long use the perforations in the shell become worn, so that the needles are not held steady, the needles may be temporarily withdrawn and the surface of the shell lightly hammered, so that the holes will be made smaller, and thus take a firmer grip upon the needles.

It is obvious that the above invention may be applied to the seed-stripper E by replacing the stripper shown in the drawings by a cylinder such as described above. In this case it may be preferable to use needles slightly longer than those used on cylinder B.

It is to be understood that I do not herein limit myself to the construction here shown and described as embodying my invention, as it is obvious that the said construction may be altered or parts thereof interchanged or omitted without varying from the scope or spirit of my invention.

The invention may be used in connection with any kind of fruit to which it is applicable and in connection with any preferred type or style of machine.

Having thus described my invention, I claim—

1. The combination of a hollow cylindrical shell, a plurality of perforations therein, a plurality of needles adapted to project through said perforations, said needles having heads on their inner ends to prevent them from being drawn through said perforations, a backing-cylinder adapted to be inserted in said shell and impinge against the heads of said needles, and means for expanding and contracting said backing-cylinder, substantially as described.

2. The combination of a hollow cylindrical shell, a plurality of perforations therein, a plurality of needles adapted to project through said perforations, a backing-cylinder adapted to be inserted in said shell and impinge against the inner ends of said needles, and means for expanding said backing-cylinder, substantially as described.

3. The combination of a hollow cylindrical shell, a plurality of perforations therein, a plurality of needles adapted to project through said perforations, a hollow split backing-cylinder adapted to be inserted in said shell and impinge against the inner ends of said needles and having a tapered inner surface, and a tapered sleeve adapted to fit the inner surface of said backing-cylinder, substantially as described.

4. In a fruit-seeding machine, the combination of a hollow cylindrical shell, a plurality of perforations therein, a plurality of needles adapted to project through said perforations, means for preventing said needles from being drawn entirely through said perforations, a hollow backing-cylinder, adapted to be inserted within said shell, and impinge against the inner ends of said needles, a longitudinal slot in said backing-cylinder, an independent filling-strip adapted to be inserted in said longitudinal slot, a plurality of inner guideways in said backing-cylinder, said guideways being tapered longitudinally to the axis of said cylinder, and a tapered sleeve adapted to fit the said guideways, and expand the latter, substantially as described.

In testimony whereof I affix my signature in presence of two witnesses.

ALEXANDER W. STOTT.

Witnesses:
M. A. RYAN,
C. V. EDWARDS.